(12) United States Patent
Hung

(10) Patent No.: US 6,327,601 B1
(45) Date of Patent: *Dec. 4, 2001

(54) LINEAR TRANSFORM SYSTEM FOR DECODING VIDEO DATA

(75) Inventor: Ching-Yu Hung, Plano, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,050

(22) Filed: Dec. 30, 1997

Related U.S. Application Data

(60) Provisional application No. 60/035,767, filed on Jan. 6, 1997.

(51) Int. Cl.[7] ................................................. G06F 17/14
(52) U.S. Cl. ................................................. 708/400; 708/402
(58) Field of Search ................................. 708/400, 401, 708/402, 403, 404, 405, 406, 408, 409

(56) References Cited

U.S. PATENT DOCUMENTS

| | | | | |
|---|---|---|---|---|
| 5,394,349 | * | 2/1995 | Eddy | 708/401 |
| 5,636,152 | * | 6/1997 | Yang et al. | 708/401 |
| 5,701,263 | * | 12/1997 | Pineda | 708/402 |
| 5,748,514 | * | 5/1998 | Okada et al. | 708/402 |
| 5,781,239 | * | 7/1998 | Mattela et al. | 348/415 |

* cited by examiner

*Primary Examiner*—Chuong Dinh Ngo
(74) *Attorney, Agent, or Firm*—Warren L. Franz; Wade James Brady, III; Frederick J. Telecky, Jr.

(57) ABSTRACT

A linear transform system (18) for decoding video data is provided. The system (18) includes inputs (50, 52, 54, 56, 58, 60, 62, 64) connected in series to a circuit (40) for implementing a decoding algorithm that includes a multiplication circuit stage (42, 44, 46) having a multiple output scaler structure (82, 84, 86). A bit-serial operator stage (48) is connected in series with the multiplication circuit stage (42, 44, 46). The bit-serial operator stage (48) is coupled to a plurality of outputs (66, 68, 70, 72, 74, 76, 78, 80) that generate decoded video data.

6 Claims, 2 Drawing Sheets

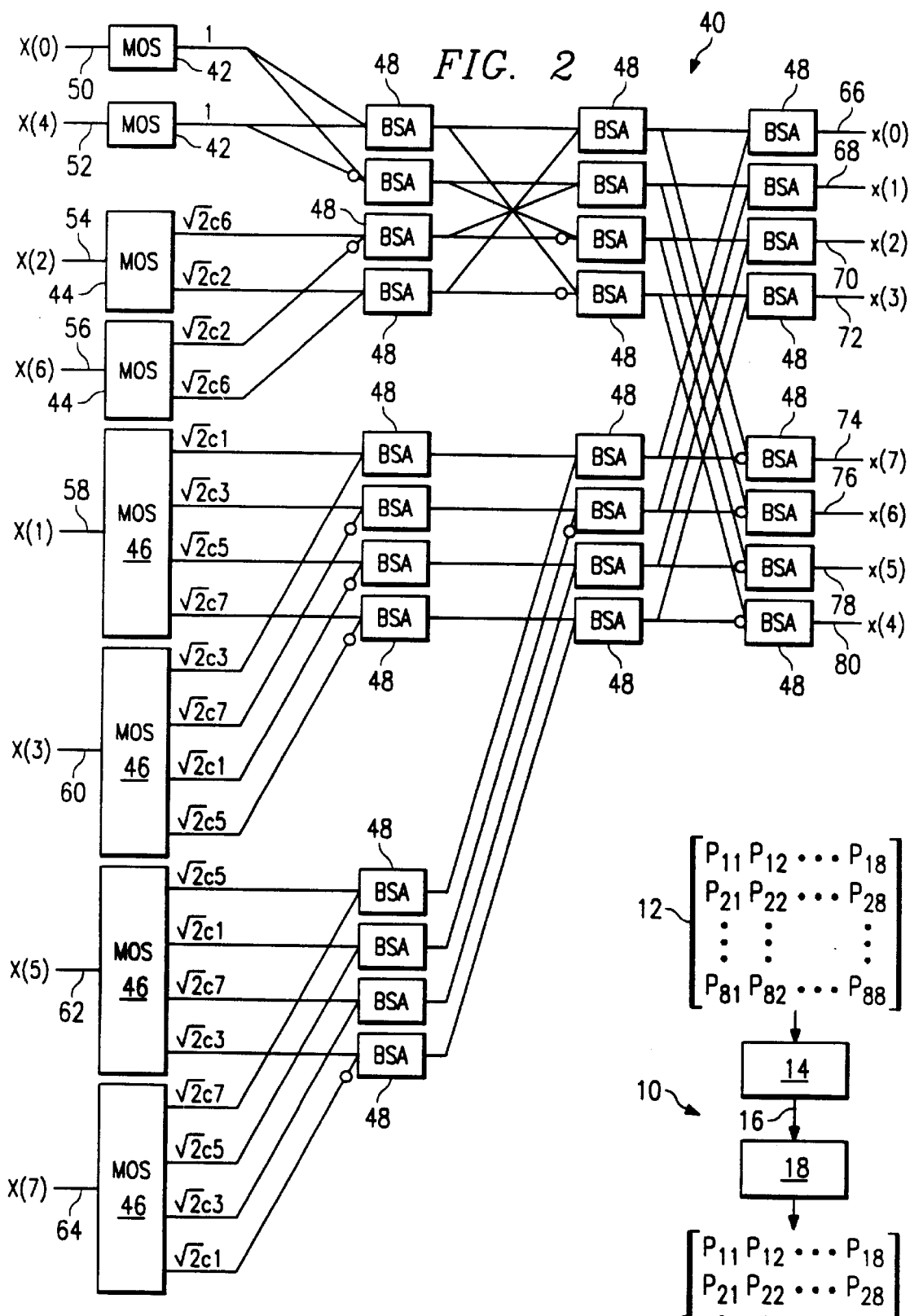

LINEAR TRANSFORM SYSTEM FOR DECODING VIDEO DATA

This application claims priority under 35 U.S.C. §119(e)(1) of provisional application Ser. No. 60/035,767 filed Jan. 6, 1997, entitled "Linear Transform System for Decoding Video Data," the entirety of which is incorporated herein by reference.

TECHNICAL FIELD OF THE INVENTION

This invention relates to digital video image processing and more particularly to a linear transform circuit for decoding video data.

BACKGROUND OF THE INVENTION

Images displayed on a video display may be digitally encoded, transmitted, and decoded. Digital encoding of video images offers many well-known advantages. For example, the effects of electromagnetic interference or noise may be reduced with digital data transmission techniques. In addition, conversion of video images into digital signals allows the video images to be processed with digital signal processing techniques, and also makes the video images compatible with other digital data processing technology.

Nevertheless, conversion of a video image into digital data creates a relatively large amount of digital data. A video image typically comprises a large number of picture elements (pixels). A pixel is the smallest resolvable spatial information element of a video display as seen by the viewer. A common display resolution is VGA which consists of 480 lines of 640 pixels each. Thus, each screen requires 307,200 pixels. In addition, color video images are comprised of three separate color pixel subdivisions at each pixel location, which results in 921,600 color pixel subdivisions for each screen. Full motion video requires the transmission of 30 screen images per second, which could require a total of 27.648 million pixels per second if each pixel is transmitted for each screen image.

Even if each pixel could be represented by a single bit of data, a 27.648 megabit data transmission rate would significantly limit the use of digital video data transmission. In practice, each pixel requires eight bits of data for MPEG compatible video. Therefore, it is necessary to compress the digital data using various techniques. Many image compression techniques have been developed.

One class of image compression techniques involves compression algorithms based on a frequency transform. In this technique, the image is generally divided into blocks of fixed size, such as 8×8 pixels. Each block is then transformed from the spatial domain to a frequency domain using a linear transform. The linear transform most commonly used for this operation is the discrete cosine transform (DCT). The discrete cosine transform has been developed in accordance with the moving pictures experts group (MPEG) algorithms, which are industry-standard algorithms used to coordinate digital signal processing of digitally-encoded video signals.

Known linear transform systems for decoding digitally-encoded video data, may involve a system that includes implementation of a binary algorithm as an electronic circuit, such as the discrete cosine transform and its inverse. Various algorithms and electronic circuits have been proposed for these linear transform systems. Nevertheless, these algorithms and electronic circuits suffer from various drawbacks. One such drawback is that a large number of discrete devices must be used in electronic circuits for such algorithms. Another drawback is that the processing time for systems implementing known algorithms may be excessive as the number of electronic circuit elements decreases. These problems are exacerbated for inverse discrete cosine transform (IDCT) circuits, which are typically used in applications that require circuit sizes to be minimized, such as at a set-up box that would be installed at a user's television set.

SUMMARY OF THE INVENTION

Therefore a need has arisen for a linear transform system for decoding digitally-encoded video data which substantially eliminates or reduces disadvantages and problems associated with previously developed linear transform system for decoding digitally-encoded video data.

In particular, a linear transform system for decoding digitally-encoded video data is required that reduces the number of discrete devices required to implement the circuit, and which reduces the amount of processing time required to process data as compared with other circuits having the same number of electronic components.

In accordance with the present invention, a linear transform system for decoding video data is provided. The system includes inputs connected to a circuit for implementing a decoding algorithm that includes a multiplication circuit stage having a multiple output scaler structure. A bit-serial operator stage is connected in series with the multiplication circuit stage. The bit-serial operator stage is coupled to a plurality of outputs that generate decoded video data.

The present invention provides many important technical advantages. One important technical advantage of the present invention is a linear transform system for decoding video data that minimizes the number of discrete components required to implement the circuit. The linear transform system for decoding video data of the present invention is optimized to decrease the number of discrete components and subsequently decrease the circuit size.

Another important technical advantage of the present invention is a linear transform system for decoding video data with decreased processing time. The linear transform system for decoding video data of the present invention compresses digitally encoded video data in less time than known linear transform systems for decoding video data having the same number of electronic components.

DETAILED DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 1 is a block diagram of a linear transform system for decoding digitally encoded data incorporating concepts of the present invention;

FIG. 2 shows a diagram of a decode circuit for implementing a decode algorithm embodying concepts of the present invention.

DETAILED DESCRIPTION OF THE INVENTION

Figure 3:
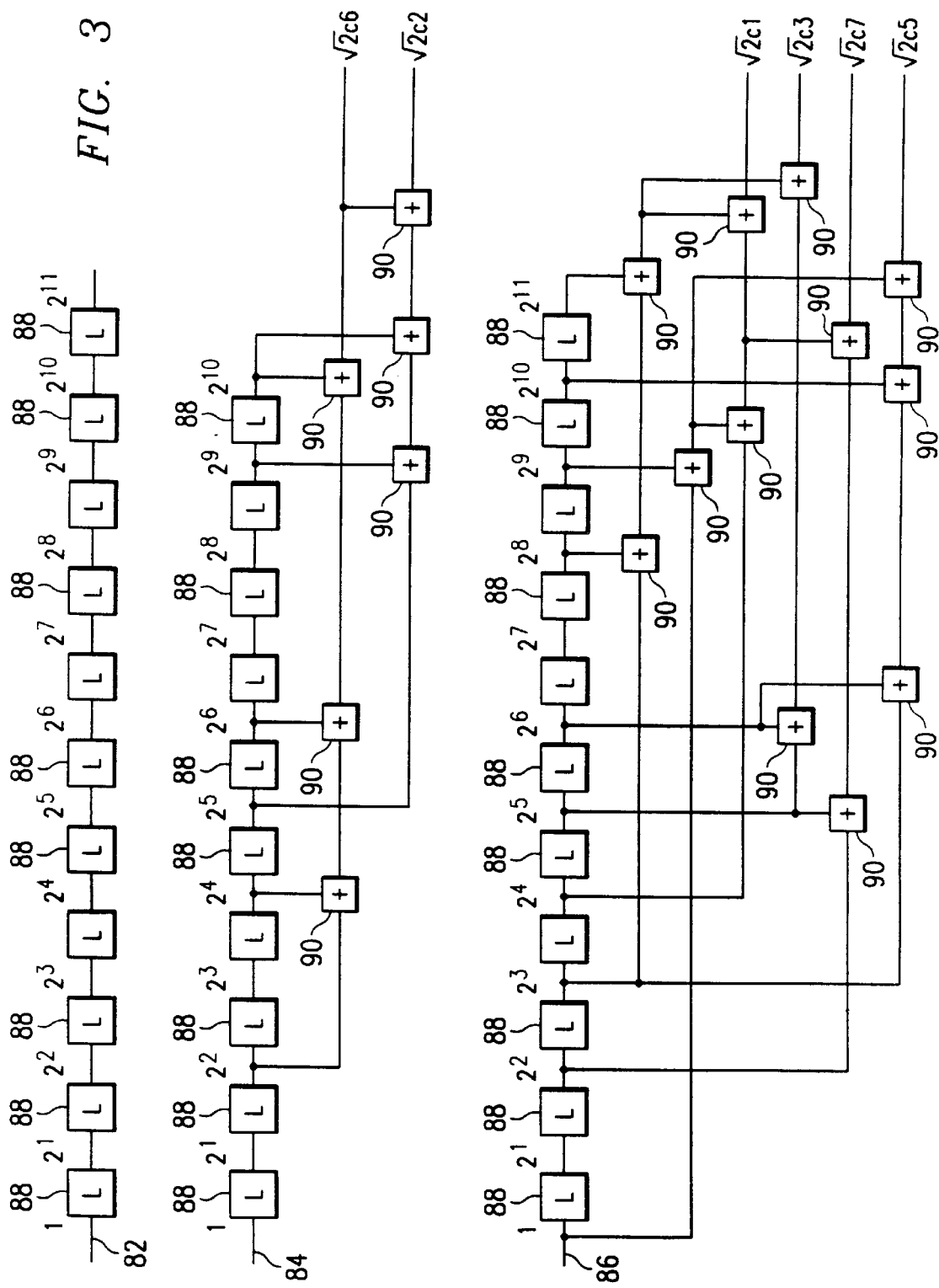
FIG. 3 shows the circuit design of multiple output scalers of the decode circuit shown in FIG. 2.

Preferred embodiments of the present invention are illustrated in the FIGURES, like numerals being used to refer to like and corresponding parts of the various drawings.

FIG. 1 is a block diagram of a linear transform system 10 for decoding digitally encoded data incorporating concepts of the present invention. Linear transform system 10 comprises pixel matrix 12, discrete cosine transform circuit 14, data transmission medium 16, inverse discrete cosine transform circuit 18 and pixel matrix 20.

Pixel matrices 12 and 20 are digitally-encoded data that describe the state of a pixel array. Pixel data may be represented by an 8-bit digital word with a value varying from 0 to 255. Many other suitable pixel array sizes and data configurations may also be used. The data stored in pixel matrix 12 should be nearly identical to the data stored in pixel matrix 20, in accordance with MPEG decoding process specifications.

Discrete cosine transform circuit 14 is a digital circuit embodying concepts of the present invention that is operable to perform a real-time linear transform on the digital data contained in pixel matrix 12, thus producing a reduced data set. Discrete cosine transform circuit 14 is coupled to data transmission medium 16, and is operable to transmit the reduced data set over data transmission medium 16.

Data transmission medium 16 may be chosen from suitable data transmission media, such as copper conductors, coaxial conductors, fiber optic conductors, or high frequency electromagnetic radiation. Data transmission medium 16 couples to discrete cosine transform circuit 14 and inverse discrete cosine transform circuit 18, and is operable to transmit data between the two circuits.

Inverse discrete cosine transform circuit 18 is a digital circuit embodying concepts of the present invention. Inverse discrete cosine transform circuit 18 is coupled to data transmission medium 16 and is operable to receive the reduced data set transmitted by discrete cosine transform circuit 14 and to transform the reduced data set into pixel matrix 20. Inverse discrete cosine transform circuit 18 accomplishes the conversion more efficiently than other known inverse discrete cosine transform circuits, and provides a minimized number of circuit devices for a fixed processing time, or a minimized processing time for a fixed number of circuit devices.

In operation, a pixel array is digitally-encoded by converting each pixel into digital data that describes the state of each pixel. This digitally-encoded data is then transmitted to discrete cosine transform circuit 14 in 8×8 pixel blocks. Discrete cosine transform circuit 14 is a real-time linear transform circuit embodying concepts of the present invention that reduces the total amount of data required to define the 8×8 pixel array. This reduced data set is transmitted over data transmission medium 16 to inverse discrete cosine transform circuit 18.

Inverse discrete cosine transform circuit 18 is a real-time linear transform circuit embodying concepts of the present invention. The digital data received at inverse discrete cosine transform circuit 18 is processed and converted back to the pixel data in pixel array 20, which is identical to the data in pixel array 12. Inverse discrete cosine transform circuit 18 provides a minimized number of circuit devices for a fixed processing time, or a minimized processing time for a fixed number of circuit devices, thus providing the transformed data in real-time more efficiently than other circuits.

FIG. 2 shows a diagram of a decode circuit 40 for implementing a decode algorithm embodying concepts of the present invention. Decode circuit 40 may be used with 1-dimensional inverse discrete cosine transform circuit 18 of FIG. 1, and includes multiple output scalers (MOS) 42, 44, and 46 and bit-serial adders (BSA) 48. Multiple output scalers 42, 44, and 46 are serially coupled to bit-serial adders 48.

Decode circuit 40 also comprises inputs 50 through 64. Data signals comprising digitally-encoded and transformed video data are received at inputs 50 through 64. These digitally-encoded and transformed video data signals are received from a remote transmitter in accordance with a standardized decoding process, such as that defined by the MPEG. The digitally-encoded and transformed video data signals received at inputs 50 through 64 are transformed by decode circuit 40 to generate digital pixel data outputs 66 through 80, which are used to generate a video image as described above.

The values of the coefficients for the inverse discrete cosine transform are given by the following equations. The transform that is performed by decode circuit 40 is the 2-dimensional inverse discrete cosine transform, which is given by the following equation:

$$f_{ij} = \frac{2}{N} \sum_{m=0}^{N-1} \sum_{n=0}^{N-1} C(m)C(n)F_{mn}\cos\frac{(2i+1)m\pi}{2N}\cos\frac{(2j+1)n\pi}{2N}.$$

The 2-dimensional inverse discrete cosine transform may be implemented with two passes of the 1-dimensional inverse discrete cosine transform, one along each dimension. The 1-dimensional inverse discrete cosine transform is given by the following equation:

$$x_i = \sqrt{\frac{2}{N}} \sum_{m=0}^{N-1} C(m)X_m \cos\frac{(2i+1)m\pi}{2N}$$

Ignoring the leading constant factor, the above equation for N=8 can be rewritten in matrix multiplication form as:

$$\begin{bmatrix} x(0) \\ x(1) \\ x(2) \\ x(3) \\ x(4) \\ x(5) \\ x(6) \\ x(7) \end{bmatrix} = \begin{bmatrix} c_4 & c_1 & c_2 & c_3 & c_4 & c_5 & c_6 & c_7 \\ c_4 & c_3 & c_6 & -c_7 & -c_4 & -c_1 & -c_2 & -c_5 \\ c_4 & c_5 & -c_6 & -c_1 & -c_4 & c_7 & c_2 & c_3 \\ c_4 & c_7 & -c_2 & -c_5 & c_4 & c_3 & -c_6 & -c_1 \\ c_4 & -c_7 & -c_2 & c_5 & c_4 & -c_3 & -c_6 & c_1 \\ c_4 & -c_5 & -c_6 & c_1 & -c_4 & -c_7 & c_2 & -c_3 \\ c_4 & -c_3 & c_6 & c_7 & -c_4 & c_1 & -c_2 & c_5 \\ c_4 & -c_1 & c_2 & -c_3 & c_4 & -c_5 & c_6 & -c_7 \end{bmatrix} \begin{bmatrix} X(0) \\ X(1) \\ X(2) \\ X(3) \\ X(4) \\ X(5) \\ X(6) \\ X(7) \end{bmatrix}$$

Where $c_K$ denotes $\cos(K\Pi/16)$. This 8-by-8 matrix is also known as the coefficient matrix.

Even after scaling, it is necessary to reduce the matrix operations shown in order to reduce the number of multiplications from 64. To generate an efficient circuit implementation of the inverse discrete cosine transform, it is necessary to use an algorithm that may be implemented as a circuit and that also decreases the processing time and the number of devices required to implement the circuit. The largest component of the processing time for a digit-serial circuit is the multiplication of inputs, as will be described below.

The even/odd matrix decomposition algorithm may be applied to the inverse discrete cosine transform coefficient matrix to reduce the number of multiplications by utilizing the symmetry/antisymmetry in the coefficient matrix. In matrix multiplication form, the inverse discrete cosine transform coefficient matrix may be reduced by the even/odd decomposition to yield:

$$\begin{bmatrix} x(0) \\ x(1) \\ x(2) \\ x(3) \\ x(4) \\ x(5) \\ x(6) \\ x(7) \end{bmatrix} = \begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & 0 & 0 & 1 & 0 & 0 & 0 & -1 \\ 0 & 0 & 1 & 0 & 0 & 0 & -1 & 0 \\ 0 & 1 & 0 & 0 & 0 & -1 & 0 & 0 \\ 1 & 0 & 0 & 0 & -1 & 0 & 0 & 0 \end{bmatrix}$$

$$\begin{bmatrix} 1 & 1 & 1 & 0 & 0 & 0 & 0 & 0 \\ 1 & -1 & 0 & 1 & 0 & 0 & 0 & 0 \\ 1 & -1 & 0 & -1 & 0 & 0 & 0 & 0 \\ 1 & 1 & -1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \begin{bmatrix} c_4 & 0 & 0 & 0 & 0 & 0 & 0 & 0 \\ 0 & c_4 & 0 & 0 & 0 & 0 & 0 & 0 \\ 0 & 0 & c_2 & c_6 & 0 & 0 & 0 & 0 \\ 0 & 0 & c_6 & -c_2 & 0 & 0 & 0 & 0 \\ 0 & 0 & 0 & 0 & c_1 & c_3 & c_5 & c_7 \\ 0 & 0 & 0 & 0 & c_3 & -c_7 & -c_1 & -c_5 \\ 0 & 0 & 0 & 0 & c_5 & -c_1 & c_7 & c_3 \\ 0 & 0 & 0 & 0 & c_7 & -c_5 & c_3 & -c_1 \end{bmatrix}$$

$$\begin{bmatrix} X(0) \\ X(1) \\ X(2) \\ X(3) \\ X(4) \\ X(5) \\ X(6) \\ X(7) \end{bmatrix}$$

Note that $c_4=1\sqrt{2}$, such that $\sqrt{2}c_4=1$. Two multiplications can thus be saved if all coefficients are scaled by $\sqrt{2}$, because two passes through decode circuit 40, which implements the 1-dimensional inverse discrete cosine transform, are required to complete a 2-dimensional inverse discrete cosine transform. In addition, the number of circuit devices required to implement decode circuit 40 may also be reduced by scaling the constant values of multiple output scalers 42, 44, and 46 by a factor of $\sqrt{2}$. After the two passes of the 1-dimensional inverse discrete cosine transform required to implement the 2-dimensional inverse discrete cosine transform have been completed, the result vector may then be corrected by dividing by two. Division by two may be accomplished for digitally-encoded data by shifting the data one bit to the right.

The inverse discrete cosine transform, as scaled, may thus be implemented with the even/odd decomposition in a form that requires only 20 parallel multiplications, and no serial multiplications. Although other matrix decomposition algorithms may require fewer multiplications, these multiplications occur serially, thus requiring a longer processing time for digit-serial circuitry. The even/odd decomposition algorithm, when implemented with digit-serial circuitry, provides the advantage of only requiring 20 parallel multiplications.

The decrease in processing time realized with the inverse discrete cosine transform circuit of the present invention compensates for any increase in the total number of electronic devices required to implement the circuit, as compared with other inverse discrete cosine transform circuits. In addition, the 20 multiplications may be implemented with multiple-output scalers, which further reduce the number of electronic devices required to implement the circuit by sharing common partial results. The single parallel multiplication stage of decode circuit 40 also minimizes the effect of rounding errors.

The scaled even/odd decomposition algorithm described above is implemented as a circuit. The first stage of the circuit is multiple output scalers 42, 44, and 46. Referring back to the coefficient matrix, the following first matrix multiplication operation must be performed:

$$X(0)' = X(0)c_4$$

$$X(4)' = X(4)c_4$$

$$X(2)' = X(2)c_2 + X(6)c_6$$

$$X(6)' = X(2)c_6 - X(6)c_2$$

$$X(1)' = X(1)c_1 + X(3)c_3 + X(5)c_5 + X(7)c_7$$

$$X(3)' = X(1)c_3 - X(3)c_7 - X(5)c_1 - X(7)c_5$$

$$X(5)' = X(1)c_5 - X(3)c_1 + X(5)c_7 + X(7)c_3$$

$$X(7)' = X(1)c_7 - X(3)c_5 + X(5)c_3 - X(7)c_1$$

As previously discussed, coefficient $c_4=1/\sqrt{2}$, such that scaling all computations by $\sqrt{2}$ results in the factors shown outside of multiple output scalers 42, 44, and 46. The remaining calculations required to implement the matrix algorithm are performed by bit-serial adders 48.

For example, consider the next set of matrix operations performed after scaling of inputs $X(0)$ through $X(7)$ by multiplying them by the factors shown above. These are:

$$X(0)'' = X(0)' + X(4)' + X(2)'$$

$$X(4)'' = X(0)' - X(4)' + X(6)'$$

$$X(2)'' = X(0)' - X(4)' - X(6)'$$

$$X(6)'' = X(0)' + X(4)' - X(2)'$$

$$X(1)'' = X(1)'$$

$$X(3)'' = X(3)'$$

$$X(5)'' = X(5)'$$

$$X(7)'' = X(7)'$$

All of these operations only require the addition or subtraction of the coefficients, and do not require multiplication.

Completing the arithmetic operations described in the even/odd decomposed matrix yields a value for the output vector of:

$$x(0) = X(0)'' + X(1)''$$

$$x(1) = X(4)'' + X(3)''$$

$$x(2) = X(2)'' + X(5)''$$

$$x(3) = X(6)'' + X(7)''$$

$$x(4) = X(6)'' - X(7)''$$

$$x(5) = X(2)'' - X(5)''$$

$$x(6) = X(4)'' - X(3)''$$

$$x(7) = X(0)'' - X(1)''$$

These operations also only require addition and subtraction, and may be performed by the bit-serial adders 48 of FIG. 2.

These operations may also be grouped as shown in FIG. 2 for improved implementation in circuit form and to minimize the complexity of connections between multiple output scalers 42, 44, and 46 and bit-serial adders 48. Thus, the eight parallel multiple output scalers may be grouped into a first group comprising multiple output scalers 42 and 44 coupled to inputs X(0), X(4), X(2), and X(6), a second group comprising the multiple output scalers 46 coupled to inputs X(1) and X(3), and a third group comprising the multiple output scalers 46 coupled to inputs X(5) and X(7).

The first, second, and third groups of parallel multiple output scalers 42, 44, and 46 are coupled in series to a corresponding first, second, and third group of a first stage of parallel bit-serial adders 48. A first group of a second stage of bit-serial adders 48 is coupled in series to the first group of the first stage of bit-serial adders 48, and a second group of a second stage of bit-serial adders 48 is coupled in series to the second and third groups of the first stage of bit-serial adders. A third stage of bit-serial adders 48 is coupled in series with the first and second group of the second stage of bit-serial adders 48.

In operation, serial data streams of digitally-encoded data are received at inputs 50 through 64 of decode circuit 40. These serial data streams are then processed by the multiple output scalers 42, 44, and 46 and bit-serial adders 48 to yield serial data streams at data outputs 66 through 80 having data values corresponding to the input data streams after processing by the 1-dimensional inverse discrete cosine transform. These output data streams are then further processed to complete the 2-dimensional inverse discrete cosine transform so as to generate pixel data.

This design process may be used for many suitable real-time linear transform circuits to provide improved processing speeds. Using bit-serial or digit-serial adders and multiple output scalers with an algorithm that has been optimized to reduce the number of serial multiplications will result in a circuit that provides a higher ratio of number of discrete circuit components to processing time than other circuits that include serial multiplication stages and that do not utilize multiple output scalers and bit-serial digit-serial adders. In particular, this design process has been applied to implementing the inverse discrete cosine transform with favorable results.

Although decode circuit 40 has been described in regards to an inverse discrete cosine transform circuit, such as 1-dimensional inverse discrete cosine transform circuit 18 of FIG. 1, a similar circuit may be used to implement a discrete cosine transform circuit, such as discrete cosine transform 14. The design of a discrete cosine transform circuit may be obtained by transposition of decode circuit 40.

In order to use decode circuit 40 in an MPEG-compatible decoding process, one column of digitally-encoded data from an 8×8 block of data is transmitted to the circuit. The resulting numerical value is then stored in an intermediate storage medium, such as a random access memory, until all eight columns have been processed and stored. Data is then retrieved from each row of the intermediate storage and is fed to decode circuit 40. The output is then stored in a second 8×8 data storage medium, one row for each row result. After eight rows have been processed, the data storage medium will contain the 2-dimensional IDCT output corresponding to the input array. This may be referred to as "computing separate horizontal and vertical 1-dimensional IDCT", or as "compute with/utilize separability".

FIG. 3 shows the detailed design of multiple output scalers 82, 84, and 86, respectively. In FIG. 3, multiple output scaler 82 may be used to implement multiple output scalers 42 of FIG. 2. Multiple output scaler 82 comprises twelve latch circuits 88. Each latch circuit 88 has a delay of one clock cycle, effectively resulting in multiplication by two. Thus, when a digital value of one (1) is entered into multiple output scaler 82, the output (in least-significant-bit-first order) will be the digital value of 2,048 (10000000000). Likewise, if the digital value of two (10) is input to multiple output scaler 82, the output will be 2×2048=4096 (1000,0000,0000). Although multiple output scaler 82 has a single output as shown in FIG. 3, additional outputs may be taken from intermediate stages of latch circuits 88, if suitable.

Multiple output scaler 84 of FIG. 3 works in a similar manner to multiple output scaler 82, and may be used to implement multiple output scalers 44 of FIG. 2. Intermediate values from latch circuit 88 outputs are provided as inputs to bit-serial adders 90 to generate outputs having the appropriate multiplier. For example, multiple output scaler 84 outputs the value of the input times $\sqrt{2}c_6$ and $\sqrt{2}c_2$. As previously described, the value of $c_6$ is equal to cos (6Π÷16)=0.38268. The square root of two times this value equals 0.541196. When the digital value one (1) is input into circuit 94, the output will be the digital value for 1,108 (10001010100). The value of $2048\times\sqrt{2}\times c_6$=1,108.369 rounded to the nearest integer is 1,108. Thus, the output of multiple output scaler 84 yields $\sqrt{2}c_6$ times the input, rounded to the nearest integer.

Multiple output scaler 86 of FIG. 3 works in a similar manner to multiple output scalers 82 and 84, and may be used to implement multiple output scaler 46 of FIG. 2. Multiple output scaler 84 outputs the value of the input times $\sqrt{2}c_1$, $\sqrt{2}c_3$, $\sqrt{2}c_5$, $\sqrt{2}c_7$.

In operation, the inverse discrete cosine transform circuit of the present invention receives digitally-encoded serial data streams at the input and outputs a serial data stream that has been processed by the 1-dimensional inverse discrete cosine transform algorithm. This processed digital data is then input into the inverse discrete cosine transform circuit of the present invention in combination with other processed data, to yield the characteristic output of a 2-dimensional inverse discrete cosine transform circuit. This data may then be used to generate an 8×8 spatial array of pixels.

As previously described, multiple output scalers 82, 84, and 86, as shown in FIG. 3, multiply the digital input signal by a factor of 2048 in order to obtain sufficient accuracy for the 1-dimensional inverse discrete cosine transform. Nevertheless, scaling by other factors may be chosen to produce a signal that is compatible with the MPEG decoding process specifications, and which provides an acceptable level of accuracy. For example, it may be desirable to scale by a factor of 4096 in order to improve the picture quality of the transmitted digital video image.

Although the present invention has been described in detail, it should be understood that various changes, substitutions and alterations can be made hereto without departing from the spirit and scope of the invention as defined by the appended claims. For example, the defined matrix decomposition algorithm may be varied as appropriate. A digit-serial architecture may be used instead of a bit-serial architecture where suitable. Furthermore, the size of the pixel matrix may be different, such as 4×4, 16×16, or other pixel matrix sizes. Likewise, scaling factors other than 2048 may also be used.

What is claimed is:

1. A linear transform method for decoding digitally encoded video data comprising the steps of:

providing a decode circuit having a plurality of inputs for receiving digitally encoded video data; providing a plurality of parallel multiple output scalers (MOSs), each MOS having an input and output terminal, said MOSs being defined in a plurality of groups of said MOSs;

coupling said inputs of said decode circuit to said inputs of said plurality of parallel MOSs;

providing a first stage of plural groups of parallel bit-serial adders (BSAs), each BSA having an input terminal and an output terminal;

coupling outputs of said MOSs to said input of said plural groups of said first stage of parallel BSAs;

providing a second stage of plural groups of parallel BSAs, each BSA of said second group having an input terminal and an output terminal; coupling the input terminals of one of said groups of second stage to the output terminals of one of said groups of said first stage of BSAs and the input terminals of another group of said second stage of plural groups of BSAs to the output terminals of the other groups of said first stage of BSAs;

providing a third stage of plural groups of parallel BSAs, each BSA of said third group having an input terminal and an output terminal;

coupling the input terminals of each of said groups of said third stage to the output terminals of each of said groups of said second stage; and providing an output from said third stage.

2. The method of claim 1 wherein each of said MOSs in one of said plurality of groups of MOSs includes a plurality of serially latch circuits including a first latch circuit and a last latch circuit, each latch circuit having an input terminal and an output terminal, the input terminal of the first latch circuit being said MOS input terminal and the output terminal of said last latch circuit being said MOS output terminal, each latch circuit providing a delay sufficient to provide a binary multiplication by two.

3. The method of claim 2 further including at least one additional output terminal taken from an output terminal of an intermediate one of said plurality of serially connected latch circuits.

4. The method of claim 3 wherein each of said MOSs in another of said plurality of groups of MOSs includes a plurality of serially connected latch circuits including a first latch circuit and a last latch circuit, each latch circuit having an input terminal and an output terminal, the input terminal of the first latch circuit being said MOS input terminal and the output terminal of said last latch circuit being said MOS output terminal, each latch circuit providing a delay sufficient to provide a binary multiplication by two, a plurality of additional output terminals taken from different output terminals of intermediate ones of said plurality of serially connected latch circuits and an adder having inputs connected to said plurality of additional output terminals for adding said inputs thereto and an output for providing a sum.

5. The method of claim 2 wherein each of said MOSs in another of said plurality of groups of MOSs includes a plurality of serially connected latch circuits including a first latch circuit and a last latch circuit, each latch circuit having an input terminal and an output terminal, the input terminal of the first latch circuit being said MOS input terminal and the output terminal of said last latch circuit being said MOS output terminal, each latch circuit providing a delay sufficient to provide a binary multiplication by two, a plurality of additional output terminals taken from different output terminals of intermediate ones of said plurality of serially connected latch circuits and an adder having inputs connected to said plurality of additional output terminals for adding said inputs thereto and an output for providing a sum.

6. The method of claim 1 wherein each of said MOSs in one of said plurality of groups of MOSs includes a plurality of serially connected latch circuits including a first latch circuit and a last latch circuit, each latch circuit having an input terminal and an output terminal, the input terminal of the first latch circuit being said MOS input terminal and the output terminal of said last latch circuit being said MOS output terminal, each latch circuit providing a delay sufficient to provide a binary multiplication by two, a plurality of additional output terminals taken from different output terminals of intermediate ones of said plurality of serially connected latch circuits and an adder having inputs connected to said plurality of additional output terminals for adding said inputs thereto and an output for providing a sum.

* * * * *